US006625306B1

(12) United States Patent
Marshall et al.

(10) Patent No.: US 6,625,306 B1
(45) Date of Patent: Sep. 23, 2003

(54) COLOR GAMUT MAPPING FOR ACCURATELY MAPPING CERTAIN CRITICAL COLORS AND CORRESPONDING TRANSFORMING OF NEARBY COLORS AND ENHANCING GLOBAL SMOOTHNESS

(75) Inventors: Sidney W. Marshall, Penfield, NY (US); Eric Jackson, Webster, NY (US); Steven J. Harrington, Webster, NY (US); Yao Rong Wang, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/455,761

(22) Filed: Dec. 7, 1999

(51) Int. Cl.$^7$ ................................................. G06K 9/00
(52) U.S. Cl. ......................................... 382/162; 345/590
(58) Field of Search ................................. 382/162–167; 358/518–540; 345/589–610

(56) References Cited

U.S. PATENT DOCUMENTS

| | | | |
|---|---|---|---|
| 2,790,844 A | | 4/1957 | Neugebauer |
| 3,870,968 A | | 3/1975 | Vosteen et al. |
| 4,205,257 A | | 5/1980 | Oguro et al. |
| 4,275,413 A | | 6/1981 | Sakamoto et al. |
| 4,403,866 A | | 9/1983 | Falcoff et al. |
| 4,500,919 A | | 2/1985 | Schreiber |
| 4,724,461 A | | 2/1988 | Rushing |
| 4,853,639 A | | 8/1989 | Vosteen et al. |
| 4,887,217 A | | 12/1989 | Sherman et al. |
| 5,003,327 A | | 3/1991 | Theodoulou et al. |
| 5,045,882 A | | 9/1991 | Roehrs et al. |
| 5,107,332 A | | 4/1992 | Chan |
| 5,243,383 A | | 9/1993 | Parisi |
| 5,299,291 A | * | 3/1994 | Ruetz ........................ 358/518 |
| 5,307,182 A | * | 4/1994 | Maltz ........................ 358/518 |
| 5,416,613 A | | 5/1995 | Rolleston et al. |

(List continued on next page.)

FOREIGN PATENT DOCUMENTS

| | | |
|---|---|---|
| EP | 0 398 502 B1 | 6/1996 |
| EP | 0 741 491 A2 | 11/1996 |
| EP | 0 747 853 A2 | 12/1996 |
| EP | 0 814 400 A2 | 12/1997 |
| EP | 0 854 638 A2 | 7/1998 |
| JP | 4-314768 | 11/1992 |

OTHER PUBLICATIONS

Okga Yaritza Ramirez, "Online System Identification Using an Adaptive Algorithm to Control Color Drift in a Making Device", (Graduate Paper submitted in partial fulfillment of degree requirements, Sep. 1999, Rochester Institute of Technology, Rochester, NY.

(List continued on next page.)

*Primary Examiner*—Jingge Wu
(74) *Attorney, Agent, or Firm*—Fay, Sharpe, Fagan, Minnich & McKee, LLP

(57) ABSTRACT

A mapping system for converting an input signal value to an output value wherein certain outputs are predetermined to be critical. An engine for converting input values to output values is associated with an input value transforming system wherein certain input values corresponding to the critical output values are transformed prior to input to the engine for adjusting the input value so that the engine generates a particularly desired output. The transforming comprises selecting a set of basis functions for effecting a warping of input values near the input value corresponding to the critical output value. The basis functions determine the extent and gradient of input value adjustment for nearby values to the critical value. The basis functions are included within an objective function defining the purpose of the system and the functions are solved to generate the desired adjusted input value. The system has particular applicability to color gamut mapping in a print system wherein output color needs to be accurately printed and colors nearby the critical color can be generated with minimal image artifacts.

20 Claims, 2 Drawing Sheets

U.S. PATENT DOCUMENTS

| | | | |
|---|---|---|---|
| 5,471,313 A | 11/1995 | Thieret et al. | |
| 5,471,324 A | 11/1995 | Rolleston | |
| 5,481,380 A | 1/1996 | Bestmann | |
| 5,483,360 A | 1/1996 | Rolleston et al. | |
| 5,491,568 A | 2/1996 | Wan | |
| 5,508,826 A | 4/1996 | Lloyd et al. | |
| 5,528,386 A | 6/1996 | Rolleston et al. | |
| 5,539,522 A | 7/1996 | Yoshida | |
| 5,544,258 A | 8/1996 | Levien | |
| 5,559,173 A | 9/1996 | Campo et al. | |
| 5,574,666 A * | 11/1996 | Ruetz et al. | 358/520 |
| 5,581,376 A | 12/1996 | Harrington | |
| 5,594,557 A | 1/1997 | Rolleston et al. | |
| 5,612,902 A | 3/1997 | Stokes | |
| 5,662,044 A | 9/1997 | Löffler et al. | |
| 5,664,072 A | 9/1997 | Ueda et al. | |
| 5,671,059 A | 9/1997 | Vincent | |
| 5,708,916 A | 1/1998 | Mestha | |
| 5,717,978 A | 2/1998 | Mestha | |
| 5,734,407 A | 3/1998 | Yamada et al. | |
| 5,734,802 A | 3/1998 | Maltz et al. | |
| 5,739,927 A | 4/1998 | Balasubramanian et al. | |
| 5,748,221 A | 5/1998 | Castelli et al. | |
| 5,749,019 A | 5/1998 | Mestha | |
| 5,749,021 A | 5/1998 | Mestha et al. | |
| 5,754,918 A | 5/1998 | Mestha et al. | |
| 5,760,913 A | 6/1998 | Falk | |
| 5,809,213 A | 9/1998 | Bhattacharjya | |
| 5,812,903 A | 9/1998 | Yamada et al. | |
| 5,822,079 A | 10/1998 | Okuno et al. | |
| 5,884,118 A | 3/1999 | Mestha et al. | |
| 5,929,874 A * | 7/1999 | Barton et al. | 358/520 |
| 5,933,256 A * | 8/1999 | Ebner | 358/520 |
| 5,963,244 A | 10/1999 | Mestha et al. | |
| 6,340,975 B2 * | 1/2002 | Marsden et al. | 345/590 |
| 6,381,361 B1 * | 4/2002 | Silverbrook et al. | 382/167 |
| 6,400,843 B1 * | 6/2002 | Shu et al. | 382/167 |

OTHER PUBLICATIONS

Po–Chieng Hung, "Tetrahedral Division Technique Applied to Colorimetric Calibration for Imaging Media", Annual meeting IS&T, NJ May, 1992, p. 419–422.

Po–Chieng Hung, "Colorimetric Calibration for Scanners and Media", SPIE, vol. 1448, Camera and Input Scanner System, (1991).

Sigfredi I. Nin et al., "Printing CIELAB Images on a CMYK Printer Using Tri–Linear Interpolation", SPIE Proceedings, vol. 1670, 1992, p. 316–324.

Henry Kang, "Color Technology for Imaging Devices", pp. 318–327.

Ocean Optics, Inc., "Miniature Lights for Miniature Spectrometers".

Chang, James Z. et al., "Sequential Linear Interpolation of Multidimensional Functions", IEEE Transactions on Image Processing, vol. 6, No. 9, Sep. 1997.

Groff, Richard, Khargonekar, P., Koditschek, D., Thieret, T., Mestha, LK, "Modeling and Control of Color Xerographic Process", Paper to be presented at the CDC99 meeting in Phoenix, Arizona, Dec. 7–10, 1999.

* cited by examiner

COLOR GAMUT MAPPING FOR ACCURATELY MAPPING CERTAIN CRITICAL COLORS AND CORRESPONDING TRANSFORMING OF NEARBY COLORS AND ENHANCING GLOBAL SMOOTHNESS

FIELD OF THE INVENTION

The subject invention relates to control systems and algorithms therefor for the art of gamut mapping and, more particularly, to color registration systems for insuring that colors are printed or displayed with the correct color.

Color correction and/or control should not be confused with color registration systems and sensors for insuring that colors are positioned properly, printed accurately, superposed correctly and/or adjacent to one another.

BACKGROUND OF THE INVENTION

Electronic color printing or display systems have a continuing need for more accurate outputs not only for achieving consistency in appearance but also assuring that when a special output color needs to be presented, that that output color is precisely accurate. Essentially all print or display color outputs are device dependent, i.e., the unique operating characteristics of that device dictate the precise output color. Accordingly, color generation in electronic systems has been particularly troublesome due to constantly varying factors contributing to the unique outputs, e.g., electronic display or print, lighting, other ambient conditions and particularly for print output devices, tendencies to drift over time. For print media, accurate color generation usually requires test patches and manual calibration wherein a lookup table (LUT) is employed to convert input signals from a scanner, processor or the like to output signals that are used to generate the print output. The generation and maintenance of LUTs can be a time consuming task.

The conversion of the input signals to output signals using such a LUT is generally described as a marking engine. Marking engines can use various color mapping techniques varying from LUTs to analytical functions for effecting the desired gamut mapping. The particular form of color mapping or marking engine employed is not important to this subject invention. This invention is applicable to any type of conversion engine.

Although the subject disclosure is primarily directed to color gamut mapping, it should be appreciated by one of ordinary skill in the art, that the transforming techniques disclosed herein can be applied to any input/output system wherein certain output control values must be precisely maintained with respect to certain critical input control values, and output values resulting from inputs near these critical input control values are best warped for a relative smooth dependency of output control values on these nearby input control values, but where the conversion function itself need not be globally adjusted. The subject invention has particular applicability in complex conversion algorithms such as in color mapping where three or four dimensional nonlinear mapping is involved.

With particular attention to digital color printing systems, when a printer has an output image including certain "critical" colors, the printer must adjust the output so that the critical colors are precisely and accurately generated. A common example would be an art agency generating a promotional image including a color that the advertiser desires to be especially accurate so it is to be rendered with the exact pantone colors, e.g., yellow and red in a Kodak® film box, Coca-Cola® red versus Pepsi® red. Such exact control usually requires adjustment of corresponding input color signals to the print engine by a feedback control loop to insure that the engine output provides the exact match. A resulting problem with this particular limited and selective matching is that print output colors near the critical color continue to be generated pursuant to the normal operation of the marking engine and thus without any adjustment relative to the critical color. More particularly, the mapping of a limited number of critical colors will leave discontinuities in the color spectra near the critical color, thereby causing objectionable image artifacts in the overall print appearance. For example, the shading in the image may not look right due to discontinuities in the color gradients near the critical color. Conventional interpolation routines have not been able to successfully overcome this problem due to their tendencies to affect colors relatively far from the critical colors and generally do not limit the region in color space where colors are changed.

The present invention contemplates a new and improved mapping scheme which overcomes the above problems and others to provide a new hierarchical strategy for locally adjusting colors around a critical color yet allowing larger regions of color space to remain unadjusted, or if there are several critical colors in a region that need to be adjusted in the same direction, the larger region can be appropriately adjusted also. The invention is readily adaptable to a plurality of marking engine schemes and, for that matter, is even applicable to transformation functions beyond color gamut mapping.

BRIEF SUMMARY OF THE INVENTION

In accordance with the present invention, there is provided a mapping system that is particularly useful in a color gamut mapping wherein input colors are mapped to corresponding output colors in accordance with the marking engine. The invention includes a method of locally transforming a set of colors comprising a critical color and nearby colors to the critical color for precisely matching the critical color to a selected output color and warping the nearby colors relative to the critical color for maintaining a smoothness in appearance among the critical colors and the nearby colors. It is assumed that there exists an approximate mapping of input colors to output colors (for example, the identity map) and that it is desired to add a small adjustment to this map. A set of basis functions are selected that locally change the mapping function with the desired smoothness and together can provide all desired adjustments and a cost is selected for each basis function that indicates the undesirability of using that basis function. Some basis functions are selected for affecting a limited portion of color space gamut comprising the critical color and only other nearby colors. Other basis functions are selected for smoothly changing a larger portion of the color space. There may be many possible combinations of basis functions that satisfy the objective of correctly mapping the critical colors and it is the subject of this invention to choose the "best" combination. The balancing between choosing several local basis functions or a few basis functions affecting a larger portion of color space is controlled by the choice of costs associated with each basis function. If high costs are associated with functions affecting a larger portion of color space then these basis functions will be used only if several critical colors can be mapped as a group using these functions.

In accordance with another aspect of the present invention, the basis functions are selected by a user to cause a transforming satisfying predetermined user standards for local adjustment and global smoothness.

In accordance with yet another more limited aspect of the present invention, the choice and weighting of the basis functions are calculated by a solution technique such as minimizing a function of the weights for the basis functions subject to correctly mapping the critical colors.

One benefit obtained from the present invention is a processing technique and a mapping system where certain predetermined critical colors are precisely and accurately output, and adjacent colors to the critical colors are warped relative to the critical colors to provide a smoothness in spectra appearance.

Another benefit obtained from the present invention is a system which provides user ability to select a set of basis functions for the transforming of nearby colors to the critical colors and yet further permits larger regions of color space to be adjusted if there are several critical colors in a region that need to be adjusted in a same direction. By an appropriate choice by the user of a set of basis functions and corresponding weights, complete control of the tradeoffs between local adjustment and global smoothness can be achieved.

Other benefits and advantages for the subject new mapping technique will become apparent to those skilled in the art upon a reading and understanding of the specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings which form a part hereof and wherein.

DETAILED DESCRIPTION OF THE INVENTION

Figure 1:
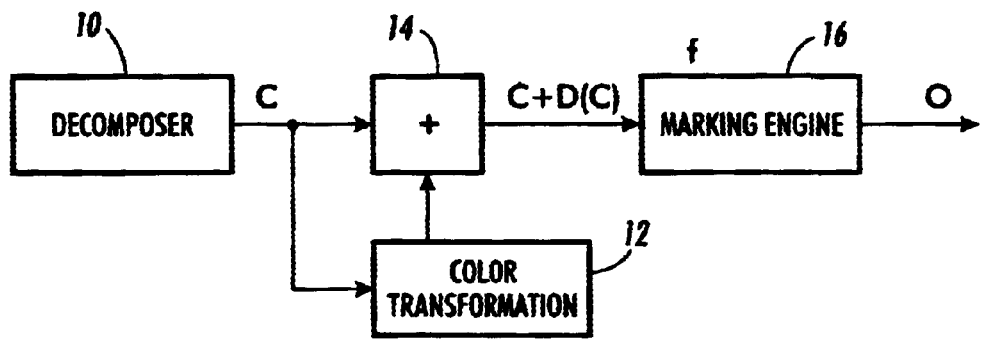
FIG. 1 is a schematic block diagram of the elements of the subject invention.

Referring now to the drawings where the showings are for the purposes of illustrating the preferred embodiments of the invention only and not for purposes of limiting same, FIG. 1 shows a block diagram illustrating the principal elements of a system formed in accordance with the present invention. Decomposer 10 such as a processor for a print description language, a scanner, or other image source, generates an input of color with vector value C which is adjusted in color transformation block 12 to generate a transforming delta vector value D(C) which is combined with the input color value C at vector adder 14. The output signal from vector adder 14 C+D(C) is input to the marking engine 16 where it is converted by print engine color transformer function f for generation of an output color value signal O. The process is represented mathematically as:

$$O=f(C+D(C)) \quad (1)$$

and the required delta for each critical color is given by $$D(C_k)=f^{-1}(O_k)-C_k \quad (2)$$

where $f^{-1}$ is the inverse f transformation.

The subject invention has a first primary purpose of mapping several critical colors $C_k$ to precisely desired output colors $O_k$. It has a second primary purpose of adjusting the outputs from the marking engine near the critical colors $C_k$ to effect a smooth dependency from $C_k$.

Let $B_i(C)$ be a set of basis functions chosen to express the desired smoothness and extent properties of the resulting transform. For example, they may be chosen to have finite support and overlap each other much like wavelets and be smooth. They can be weighted so that hierarchically larger regions are discriminated against. More basis functions than necessary to form a complete basis set are defined so they form a redundant basis set. This allows the algorithm to select a different balance of basis functions depending on the particular problem to be solved.

Although in actual operation color gamut mapping involves three or four dimensional nonlinear transformations, for purposes of this disclosure, and because it can be just as well appreciated to one of ordinary skill in the art, a set of unidimensional basis functions 20–28 are shown. Such unidimensional functions could be used, for example, for adjusting the black only toner response curve of an image which is a single dimension transform. Full color gamut mapping is at least three dimensional.

Figure 2:
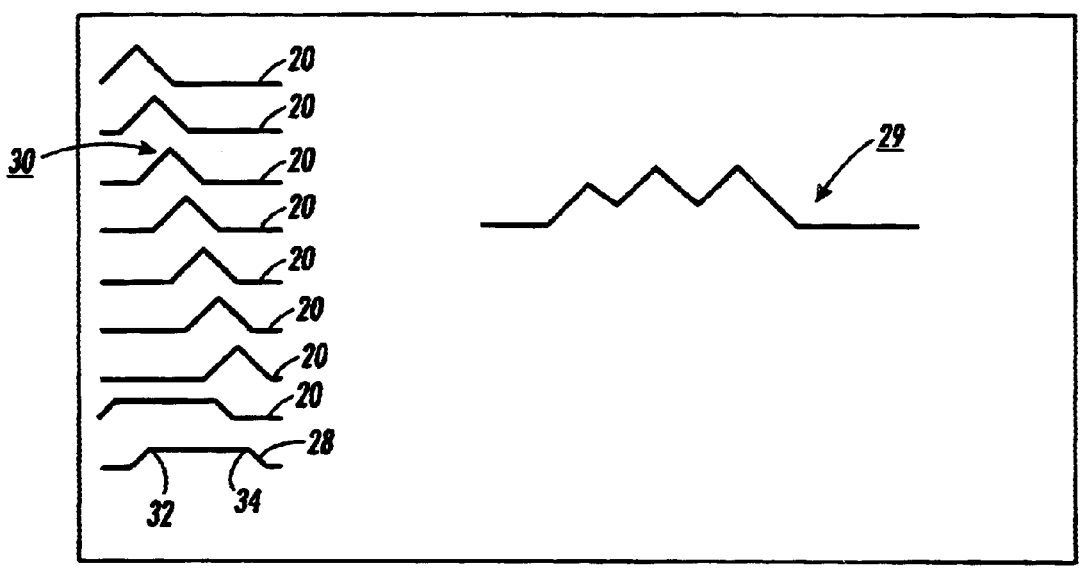
FIG. 2 is a representative set of possible basis functions for selection by the user; and, FIG. 3 comprises a flowchart of processing steps involved in the practice of the invention.

Functions 20–26 have narrow support and will only affect nearby values when applied as a transforming function. In other words, if the peak 30 of function 22 were applied to a particular input value to transform the input value to the value that would cause the marking engine to generate the precisely desired output value, then those input values near the peak 30 would be transformed in a lesser manner as per the gradient of the function 22. In other words, the basis function as represented by the triangular shaped curve of the basis function 22 would effectively warp the nearby values from the original input value to adjusted input values which diminish as the input values became spaced from the peak 30 of the function 22. For multidimensional color gamut mapping, the basis function could have a tetrahedron configuration but the transformational warping illustrated is the same. Basis functions 27 and 28 have wider support, i.e., the span between points 32, 34, and will likely require a larger coefficient in the transforming solution because, as can be appreciated, the amplitude of the basis functions is less than the amplitude of (point 30) of the other basis functions. Again, the basis functions shown in FIG. 2 are merely for purposes of illustration and a user may select different basis functions to acquire an output appearance satisfying some other desired results for minimizing the image artifacts.

Given a set of basis functions the problem of determining a map reduces to finding a solution for the coefficients $a_i$ to the following equations (one equation for each value of k where k corresponds to individual critical color values):

$$O_k=f(C_k+\Sigma_i a_i B_i(C_k)) \quad (3)$$

or $$D(C_k)=f^{-1}(O_k)-C_k=\Sigma_i a_i B_i(C_k) \quad (4)$$

where the $B_i$ are the basis functions. Since the $B_i(C_k)$ form a redundant basis there may be several solutions to these equations. In choosing one of these solutions one is guided by other considerations such as smoothness and minimizing the number of colors affected. A simple method is to allow the user to choose a minimal set of basis functions (and possibly their parameters, e.g., the center and spread of a gaussian function), solve the equations using these basis functions to insure that the critical colors are mapped correctly, present the resulting image to the user, and continue to allow further adjustments until the user is satisfied. An extension of this method would be to allow the user to choose a redundant set of basis functions and also specify some extra constraints (possibly parameterized).

Another method is to choose the $a_i$ that minimizes $\Sigma_i a_i^2$. This known method for parameter identification is commonly referred to as a least squares estimation technique and effectively operates to minimize the number of basis functions used and also minimizes the individual amplitudes maintaining a balance between local support functions and functions with larger support. Notice that in equation (3) the $a_i$ enter linearly so solving this is a standard least squares problem. The solution involves solving a set of linear equations. Since this solution is a linear operation on the values of the critical colors, the result is merely the superposition of the solutions for each of the critical colors considered separately and then summed. Where several critical colors are nearby each other, the warping solution could have an appearance as curve 29.

If there is to be any difference in the use of the basis functions used as a function of which critical colors are selected or how much they are to be corrected then a nonlinear criteria for determining the $a_i$ must be employed. One standard nonlinear method is to use linear programming to solve for the $a_i$. One then solves for the $a_i$ that minimizes min $\Sigma_i |a_i|$.

This would favor using as few of the $a_i$ (or basis functions) as possible and thereby favoring the use of a few of the larger support basis functions over using many of the smaller support basis functions. If one multiplies the height of the basis function by 0.9 (for example) every time the support for the basis function increases it will favor using basis functions with smaller support unless the larger support function helps map several colors at once.

If there is noise or uncertainty in the model or measurement of the print engine 16 then smoothing can be applied to the model by including the equations to be solved in the least-squares part of the formulation. Then we find $a_i$ that minimizes $\Sigma_k w_k (f^j(C_k)) \Sigma_i a_i B_i (C_k))^2 + \Sigma_i |a_i|$ where the $w_k$ are weights indicating how accurate or important the colors $C_k$ are and $f^j$ is the Jacobian of f.

This method can also be used to generate gamut maps having certain desired properties. The basis functions indicate what kind of maps are to be considered and the colors to be mapped indicate what the map is to accomplish. The result of the calculation then gives the desired mapping. (Practitioners skilled in the state of the art will realize that summations over k can be replaced by integrals over a range of colors to be mapped without affecting the argument or results.)

Note that these adjustments can be weighted to encourage modifying only certain components of the color specifications. For example, for applications where hue is important the subject invention could be used to only match the chrominance and leave the other color dimensions alone by choosing basis functions that only affect chrominance.

Weight can also be given to colors that should not change. Skin colors may have preferences on them not to appear too green. The neutral colors can have restrictions not to move from the neutral line. Colors on the edge of the gamut can be constrained to move only to another color on the edge of the gamut. The eigen values of the Jacobian of the color transformation might have limits as to its maximum or minimum eigen value.

All of the above features can be applied after the image is segmented. Each segment is treated separately and can use different color transformations. For example, all of the boxes of Kodak® film could be in only one segment of an overall image and a transformation as described above could be applied only to that segment (representing the collection of Kodak® boxes). This segmentation could be automatic or manual.

The transformation discussed above can be combined with other color transformations such as a color correction transformation used by the print engine to map between input color space and printer output space. This allows the addition of the ideas in this invention to a system without increasing the time it takes to perform the extra color transformations.

Figure 3:
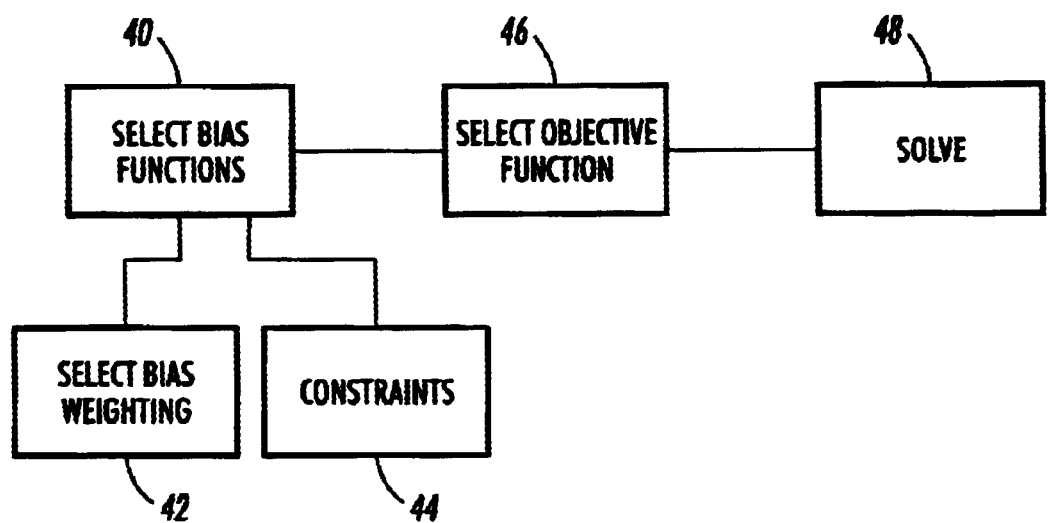

With particular reference to FIG. 3, a flowchart illustrates the method for transforming an input signal prior to its conversion to an output value by a marking engine. The input value C is converted to an adjusted input value C+D(C) through a transformation function determined by first selecting 40 the set of basis functions representing operator preferences between local adjustment and smoothness. In addition, selective weighting 42 or constraining 44 parameters for simultaneous solution of the basis functions contribute to the form of the basis functions. An overall objective function for the transformation process is also selected 46 which may include, for example, that the critical colors be accurately and precisely matched to a selected output. After the functions have been determined, an input data can be applied to them and a solution 48 obtained. The solution comprises an adjusted input value which can be converted by the marking engine 16 to generate an output signal value.

The invention has been described with reference to the preferred embodiments. Obviously modifications and alterations will occur to others upon a reading and understanding of the specification. It is our intention to include all such modifications and alterations in so far as they come within the scope of the appended claims or the equivalents thereof.

Having thus described our invention, we now claim:

1. A method for controlling color space mapping in a printing or display system wherein certain colors are predetermined to be accurately outputted as selected output colors and wherein colors nearby the certain colors are relatively warped during the mapping to provide an output comprising an appearance in color spectra satisfying operator standards for local adjustment and global smoothness, comprising steps of:

selecting a warping function and a set of bases functions for effecting the mapping of the certain colors and the adjacent colors in accordance with the operator standards;

selecting an objective function including the warping function for adjusting input colors to facilitate the color mapping; and, mapping input colors to output colors in accordance with a marking engine wherein the input colors are transformed in accordance with the warping and objective functions.

2. The method as defined in claim 1 wherein the selecting the basis functions comprises a selecting of functions for minimizing discontinuity in the color spectra appearance.

3. The method as defined in claim 1 wherein the mapping includes solving a transformation function comprising the objective and basis functions in accordance with a constraining function.

4. The method as defined in claim 3 wherein the constraining function comprises minimizing a set of coefficients for the basis functions.

5. In a color mapping system wherein input colors are mapped to corresponding output colors in accordance with a marking engine, a method of locally transforming a set of colors comprising a critical color and nearby colors to the critical color for matching the critical color to a selected output color and warping the nearby colors relative to the critical color for maintaining a selected smoothness in appearance between the critical colors and the nearby colors, comprising the steps:

selecting an objective function and a set of basis functions for the locally transforming;

transforming an input color in accordance with the objective and basis functions for generating a transformed input color; and, generating an output color with the marking engine from the transformed input color.

6. The method as defined in claim 5 wherein the basis functions are selected for affecting a limited portion of color space gamut comprising the nearby colors and the transforming comprises generating a limited number of transformed input colors having a different identity than the input color.

7. The method as defined in claim 5 wherein the transforming comprises constraining a simultaneous solution of the basis functions by minimizing a corresponding set of coefficients to the basis functions.

8. The method as defined in claim 5 wherein the transforming comprises utilizing nonlinear criteria for determining coefficients $a_i$ for the basis functions and a solution for the coefficients is determined by a linear programming minimizing $\Sigma_i |a_i|$.

9. The method as defined in claim 5 wherein the transforming comprises utilizing nonlinear criteria for determining coefficients $a_i$ for the basis functions and a solution for the coefficients is determined by a linear programming minimizing $\Sigma_k w_k (f^j(C_k)) \Sigma_i a_i B_i(C_k))^2 + \Sigma_i |a_i|$ where the $w_k$ are weights for adjusting the colors $C_k$ and $f^j$ is the Jacobian of f.

10. The method as defined in claim 5 wherein the transforming includes weighting the basis functions for encouraging modification of selective components of the color mapping.

11. The method as defined in claim 10 wherein the weighting encourages at least one of hue, luminance, gamut edge constraints or skin tone colors.

12. The method as defined in claim 10 further comprising segmenting an image to be mapped into a plurality of segments, each of the segments being transformed in accordance with a particular objective function and set of basis functions selected for each segment.

13. A printing apparatus including a color mapping system wherein input colors are mapped to corresponding output colors in accordance with a marking engine by locally transforming a set of colors comprising a critical color and nearby colors to the critical color for matching the critical color to a selected output color and warping the nearby colors relative to the critical color for maintaining a selected smoothness in appearance between the critical colors and the nearby colors, comprising:

an objective function and a set of basis functions for the locally transforming;

a processor for transforming an input color in accordance with the objective and basis functions for generating a transformed input color; and, a marking engine for generating an output color from the transformed input color.

14. The printing apparatus as defined in claim 13 wherein the basis functions are selected for affecting a limited portion of color space gamut comprising the nearby colors and the processor for transforming comprises means for generating a limited number of transformed input colors having a different identity than the input color.

15. The printing apparatus as defined in claim 13 wherein the processor for transforming comprises means for constraining a simultaneous solution of the basis functions by minimizing a corresponding set of coefficients to the basis functions.

16. The printing apparatus as defined in claim 13 wherein the processor for transforming comprises means for utilizing nonlinear criteria for determining coefficients $a_i$ for the basis functions and a solution for the coefficients is determined by a linear programming minimizing $\Sigma_i |a_i|$.

17. The printing apparatus as defined in claim 13 wherein the processor comprises means for utilizing nonlinear criteria for determining coefficients $a_i$ for the basis functions and a solution for the coefficients is determined by a linear programming minimizing $\Sigma_k w_k (f^j(C_k)) \Sigma_i a_i B_i(C_k))^2 + \Sigma_i |a_i|$ where the $w_k$ are weights for adjusting the colors $C_k$ are and $f^j$ is the Jacobian of f.

18. The printing apparatus as defined in claim 13 wherein the processor for transforming includes means for weighting the basis functions for encouraging modification of selective components of the color mapping.

19. The printing apparatus as defined in claim 18 wherein the means for weighting encourages at least one of hue, luminance, gamut edge constraints or skin tone colors.

20. The printing apparatus as defined in claim 18 further comprising means for segmenting an image to be mapped into a plurality of segments, each of the segments being transformed in accordance with a particular objective function and set of basis functions selected for each segment.

* * * * *